INVENTOR.
GEORGE L. HAMMON

Oct. 4, 1966 G. L. HAMMON 3,276,277
MANUALLY OPERABLE VALVE
Original Filed Nov. 19, 1963 2 Sheets-Sheet 2

INVENTOR.
GEORGE L. HAMMON
BY
Clarence W. Martin

United States Patent Office 3,276,277
Patented Oct. 4, 1966

3,276,277
MANUALLY OPERABLE VALVE
George L. Hammon, Oakland, Calif., assignor to Hammon Precision Equipment Company, Oakland, Calif., a corporation of California
Original application Nov. 19, 1963, Ser. No. 324,811. Divided and this application Jan. 15, 1965, Ser. No. 425,891
2 Claims. (Cl. 74—107)

The invention concerns improvements in cutting torches, and more particularly relates to means for interchanging a manually operable valve handle for an automatically operable valve actuating device without having to change the setting of the automatic device.

The invention further relates to manually operable valves having handles which are lifted to move an actuating member along the axis of its length to open the valve, and which handle may be moved to any rotated position about said axis either before, after, or during such opening movement without affecting the opening or closing of the valve.

This application is a division of my patent application Serial No. 324,811, filed November 19, 1963.

A main object of the invention is to substitute a manual control for an automatic control without having to change the setting of the automatic controls.

Another object is to provide a manually operable valve opening handle which may be rotated completely about its axis to thus enhance the utility of the valve in that the valve may thus be used under crowded conditions wherein a fixed handle relationship would be considered impossible.

Other objects and advantages will become apparent from the following detailed description when read in conjunction with the drawing, given by way of example only, and in which.

Figure 1:
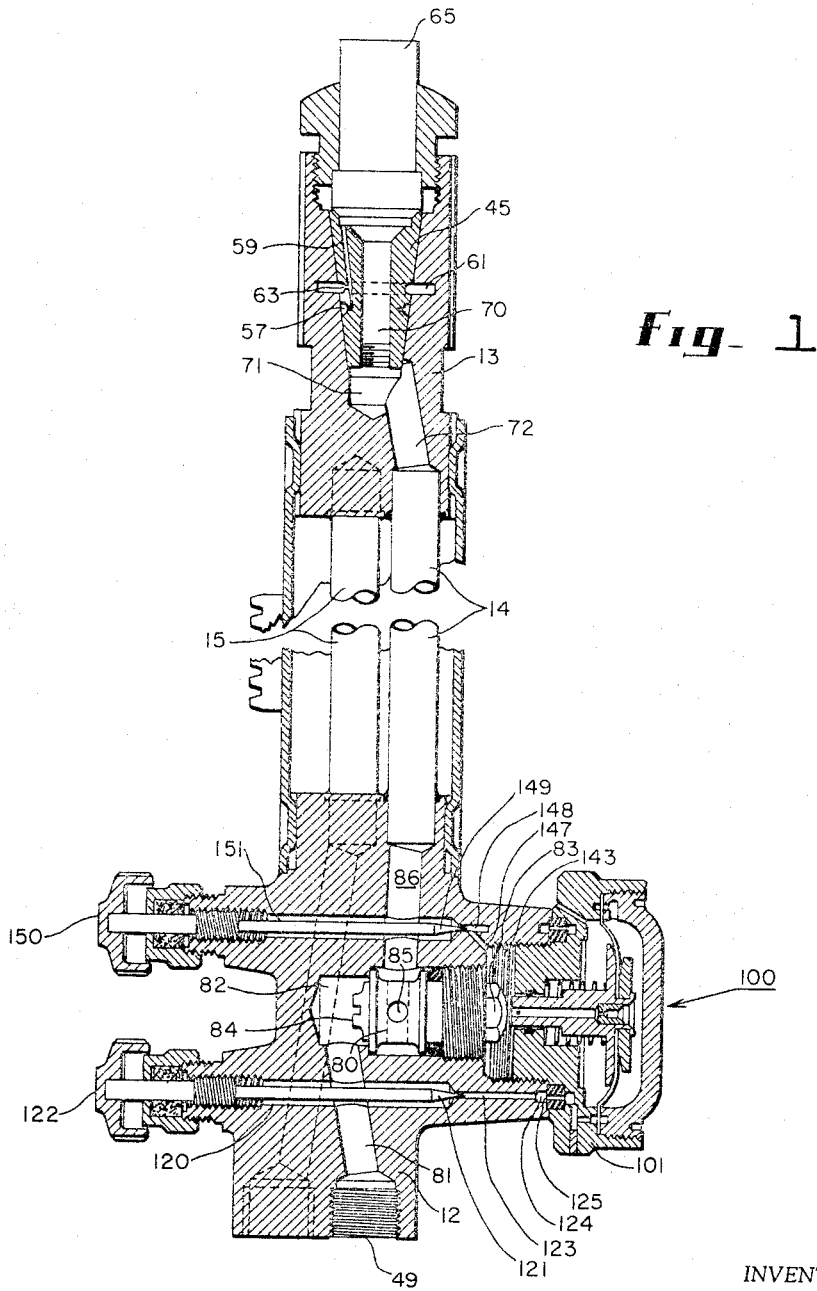
FIGURE 1 is a view, partially in section, of the main body of a torch and an automatically operable valve for controlling the cutting oxygen supply.

A main torch in which the invention is disclosed as being embodied comprises a valve housing block 12 (FIGURE 1), a gas mixer housing block 13 and three gas transmitting tubes such as tubes 14 and 15 connected between the two housing blocks to form an integral unit. A third tube, hidden behind tube 14 in FIGURE 1, is shown at 16 in FIGURE 4.

The torch block 13 carries a gas mixing unit 45 which is of conventional construction, reference being had to my Patent application Serial No. 189,484, filed April 23, 1962, now Pat. No. 3,192,987, for a more complete description of such a mixing unit.

Figure 4:
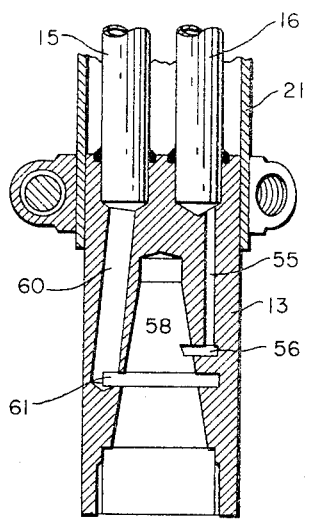
FIGURE 4 is a view, in section, of a portion of the torch body which receives a heating and burning tip.

Oxygen and acetylene gases are supplied through tubes 15 and 16 respectively, as shown in FIGURE 4 to block 13, the tubes being brazed to the block and the supply of gases to tubes 15 and 16 being controlled by a pair of conventional manually controlled valve knobs (not shown).

Since the control of the acetylene and oxygen gases to the mixing unit 45 for purposes of heating the object to be burned is conventional, further description of the valves is believed unnecessary.

Referring to FIGURE 4, a controlled supply of oxygen is transmitted through tube 16 to a passageway 55 in the block 13. From passageway 55, oxygen flows through another passageway 56 to an annular passageway 57 (FIGURE 1) formed in part by a recess in the gas mixing unit 45 and the interior wall of a cavity 58 (FIGURE 4) in the block 13. The oxygen then flows through tubes 59 (FIGURE 1) in the mixing unit. Meanwhile, acetylene is transmitted through tube 15, (FIGURE 4) and through passageways 60, 61 to the mixing unit 45 (FIGURE 1), the latter having aspirating tubes 63 opening into the previously mentioned oxygen tubes 59. Acetylene is drawn into tubes 59 and mixed therewith as described in the previously mentioned patent to produce a gas mixture which is transmitted to a combination heating and burning tip, the mixed gases flowing through passageways separate from the burning gas and, when ignited, producing a heating flame in conventional manner.

The mixing unit 45 has a central opening 70, one end of which opening stands adjacent a chamber 71 in block 13. Oxygen, under controlled pressure, described hereinafter, flows through tube 14 to a passageway 72, through chamber 71 and opening 70. The end of opening 70 is in gas tight communication with a central opening in tip 65. When the object to be cut is heated by the burning of the previously described mixture of oxygen and acetylene, oxygen is fed through the central opening of the mixer unit and the tip to burn the object and cut therethrough by known oxidizing action. The means for controlling the supply of burning oxygen is novel and described next.

An opening 49 in block 12 receives oxygen under high pressure from a supply line which may feed a plurality of torches of the presently described type. When the torches are used simultaneously to machine-cut a plurality of objects, the supply of burning oxygen simultaneously to all torches previously has caused two problems: (1) the burning action of the torches has been sequential, rather than simultaneous due to the drop in pressure in the supply line, thus causing dishing or undesirable opening of the initial cut, of one or more objects being cut, and (2) it has been impossible to begin the operation of the mechanism for advancing the torches at a pre-determined time after opening the main oxygen supply line, due to the indefinite drop in pressure, described above.

The present invention overcomes these difficulties by providing a novel gas pressure regulated valve on each torch which is opened slowly at a pre-determined rate and which prevents both the above described dishing action and sudden drop in line pressure.

A valve, generally indicated at 80 (FIGURE 1) controls the flow of oxygen between inlet 49 and the tube 14. Valve 80 is a self-contained unit threaded into block 13 and is similar to the valve 40 shown in my Patent No. 3,045,694 issued July 24, 1962. Briefly, gas tends to flow through opening 49 and a passageway 81 in block 12 to a chamber 82; however, the valve 80 normally prevents the flow of gas until a valve button 83 is depressed. At such time gas flows over valve head 84 into the valve and out of a hole 85 in the valve body. From hole 85 gas flows through a passageway 86 and into tube 14 to cause a burning action, previously described.

Figure 3:
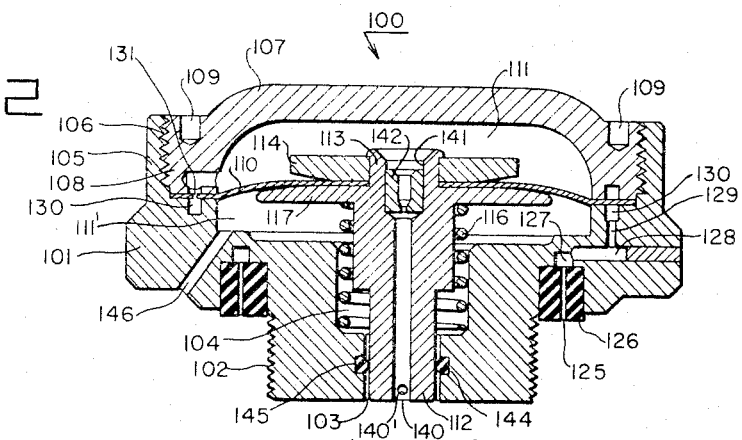
FIGURE 3 is a detailed view, in section, of the automatically operable valve control means.

Valve button 83 is depressed by under the control of a gas regulated mechanism comprising a self-contained unit generally indicated at 100 (FIGURES 1 and 3). The unit may be inserted or removed as a whole in case it is preferred to use an alternative manual control unit, described hereinafter.

Unit 100 comprises a main body 101 (FIGURE 3) having a reduced portion threaded as at 102 and adapted to be screwed into internal threads in the torch body 12. A central bore 103 and a cavity 104 are formed in body 101. An upper extension 105 is internally threaded as at 106 to receive a cap 107, threaded at 108. Holes 109 in cap 107 receive lugs (not shown) of a cap tightening tool to lock the cap tightly against the outside edges of a circular diaphram 110 made of plastic material or the like. Thus, a chamber formed between the body 101 and cap 107 is divided into two chambers 111 and 111' by the diaphram. An actuating device 112, generally having the shape of a T in section, has an upper extension 113 which protrudes through an appropriate sized hole in the diaphram. A circular backing plate 114 lies adjacent the opposite side of the diaphram and the upper end of the extension 113 is die riveted over the backing plate to produce a tight seal between the diaphram 110, the actuating device 112 and the backing plate 114.

The bottom of the actuating device stands over and closely adjacent the valve button 83 (FIGURE 1) and, as described hereinafter, is moved to open the valve by a predetermined amount; however, a spring 116 (FIGURE 3) having one end seated in the bottom of chamber 104 and the other end lying against the T shaped arm 117 normally holds the actuating device 112 away from the valve button.

Referring to FIGURE 1, a passageway 120 is formed in body 12, and which passageway intersects the oxygen passageway 81. A manually controlled needle valve, comprising a needle 121 and a knob 122, is provided to prevent or to permit the flow of oxygen through a passageway 123 in body 12. Passageway 123 terminates in an annular recess 124, the recess transmitting gas to a hole 125 in a sealing gasket 126 (FIGURE 3) located between body 12 and body 101. Oxygen flows through hole 125, annular chamber 127 in body 101, and therefrom through holes 128 and 129 into an annular chamber 130 formed in body 101. A hole 131 in the diaphram transmits oxygen to chamber 111 and, under pressure, tends to move diaphram 110 and the actuating device 112 in such manner as to depress the gas valve button 83 (FIGURE 1) to a full open position; however, the following means are provided to control the exact amount to which the button is to be depressed.

The T shaped actuating device 112 (FIGURE 3) has a central bleeder bore 140 and an enlarged bleeder bore 141 cut therein. A porous gas filter 142 in bore 141 permits oxygen to flow through bore 140 and transverse bores 140' into a chamber 143 (FIGURE 1) formed in body 12 beneath the diaphram valve body 101. An O ring 144 (FIGURE 3), located in an annular recess 145 of body 101, is compressed by the actuating device 112 to provide a gas tight seal between the chamber 143 (FIGURE 1) and chamber 104 (FIGURE 3). In case the O ring 144 should leak, a counterbalancing pressure would build up beneath under side of the diaphram 110; therefore, a vent hole 146 is drilled in body 101 to prevent the buildup of such a pressure. Passageways 147 and 148 (FIGURE 1) permit the oxygen to flow from chamber 143 through a needle valve 149 controlled by knob 150. Oxygen then flows into a passageway 151 which intersects the previously described passageway 86.

From the foregoing description it will be seen that the self-contained unit 100 is operable under control of valve knobs 122 and 150 to open the oxygen valve 80. In operation, the knob 122 may be opened to a full position while knob 150 is adjusted to determine the amount of gas that is bled from the pressure control unit 100. In this manner the oxygen cutting action of the torch, or plurality of torches, may be predetermined. When a plurality of torches is used to cut identical patterns, the knobs 150 are pre-adjusted so that each torch cuts in the same manner as the other torches. Furthermore, when the main supply line valve is opened, the valves 80 are opened slowly under the control of the units 100 so that there is no appreciable pressure drop at any valve and no dishing occurs. Also, since the lead time of the valves is predetermined, automatically operable means may be used to start the cutting advance of the torches a predetermined length of time after the main supply line is opened.

Figure 2:
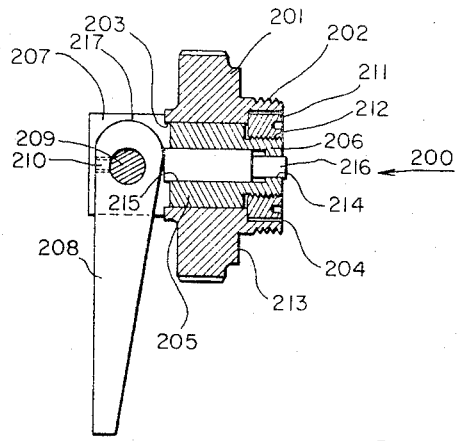
FIGURE 2 is a view, partially in section, of a manually operable means which is interchangeable with the automatically operable control means.

If conditions should arise where it is desirable to operate the valve 80 manually, the following mechanism is provided which is interchangeable with the unit 100. Assume first that unit 100 is unscrewed from body 12 and that the unit 200 (FIGURE 2) is inserted in place of unit 100. Unit 200 comprises a main body portion 201 threaded at 202 for purposes of being threaded into the body 12. Bores 203 and 204 extend through body 200 as shown. Bore 203 receives a cylinder 205 the rightmost end of which is of reduced diameter and threaded as at 206. The leftmost end 207 of cylinder 205 is of enlarged diameter and has a slot cut therethrough to form two extensions 207 which receive a handle 208 therebetween. Handle 208 is pivoted on a nylon shaft 209 carried by extensions 207. A lock screw 210 in handle 208 holds the handle on the pivot and prevents endwise movement of the pivot. A large cylinder 211 having internal threads 212 is tightly screwed onto cylinder 205 to form an integral unit which is laterally fixed relative to body 201 but which may be freely rotated therein.

Cylinder 205 has a pair of bores 214 and 215 cut therein to receive a nylon actuating pin 216 and which pin stands opposite the button 83 of valve 80. During the operation of the torch under the control of the manually operable unit 200, the valves 122 and 150 may be closed, or they may remain in pre-set stages in anticipation of further use under control of the unit 100. In either event the valve 80 (FIGURE 1) is operated under control of the handle 208. When the handle 208 is rotated clockwise from the position shown, a camming surface 217 depresses the actuating pin 216 and opens the valve 80.

Since the torch is adaptable for use upon different types of multiple torch cutting machines, the possibility arises that if a handle such as handle 208 were limited to a single plane of operation, it might be obstructed from opening or closing in any position in which the axis of the pivot 209 is fixed; however, since the cylinders 205 and 211 are freely rotatable within the body 201, it will be noted the assembly comprising the cylinders, the handle, and the pivot thereof, are rotatable as a unit to permit the handle to stand clear of any obstruction otherwise presented to the free operation of the handle.

From the foregoing description it will be apparent that the torch of the present invention presents many advantages over previously known torches.

The oxygen burning control valve may be operated either manually or automatically by respective units which are completely interchangeable without altering the mechanical construction of the torch in any manner other than to substitute the one control unit for the other. Thus, the services of the torch not only are enhanced but also provide a saving in set-up time when such changes must be made since otherwise an entire torch would have to be substituted for another torch.

I claim:
1. In a gas torch having a main body;
    a body portion removably threaded into said main body;
    a first bore and a second smaller bore in said body portion, said bores being in axial alignment with each other and extending through said body portion;
    a first cylinder having a first portion located in said smaller bore and having a reduced second portion extending into said first bore;
    a cap on said first portion lying adjacent the body portion at an end opposite the large bore;
    a second cylinder which is larger than said first cylinder, which second cylinder is fixed on said reduced end portion of the first cylinder, and which second cylinder is located within said first bore;

a bore extending through said first and second cylinders;
an operating element in said last mentioned bore;
said cap having a slot formed therein transverse to the axis of said cylinders to form a pair of upstanding ears,
a pivot member carried by said ears,
a handle mounted on said pivot member, and
a camming surface on said handle for actuating said operating element.

2. A gas torch as defined in claim 1 in which the handle may be operated in any rotated position of the cylinders.

References Cited by the Examiner
UNITED STATES PATENTS

| | | | |
|---|---|---|---|
| 661,003 | 10/1900 | Stahl | 251—263 |
| 2,872,149 | 2/1959 | Battey et al. | 251—263 X |

M. CARY NELSON, *Primary Examiner.*

MARTIN P. SCHWADRON, *Examiner.*

S. SCOTT, *Assistant Examiner.*